Figure 1:
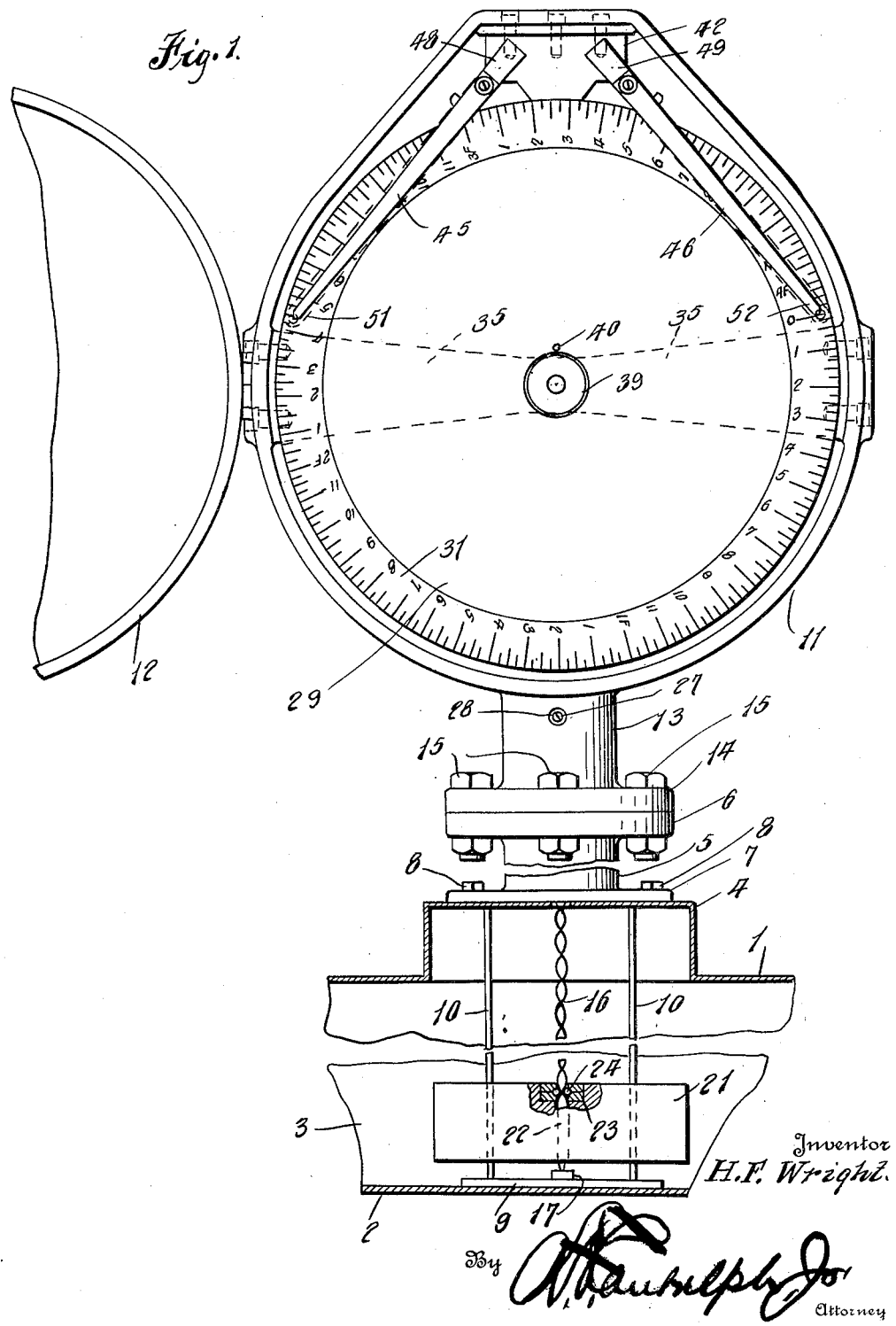

July 31, 1928.

H. F. WRIGHT 1,679,285

GAUGE AND RECORDER

Filed April 14, 1927    2 Sheets-Sheet 1

Inventor
H. F. Wright.
By
Attorney

July 31, 1928.  
H. F. WRIGHT  
GAUGE AND RECORDER  
Filed April 14, 1927  
1,679,285  
2 Sheets-Sheet 2
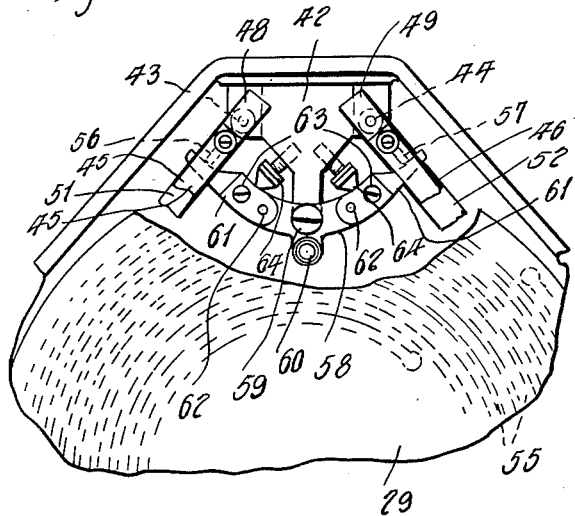
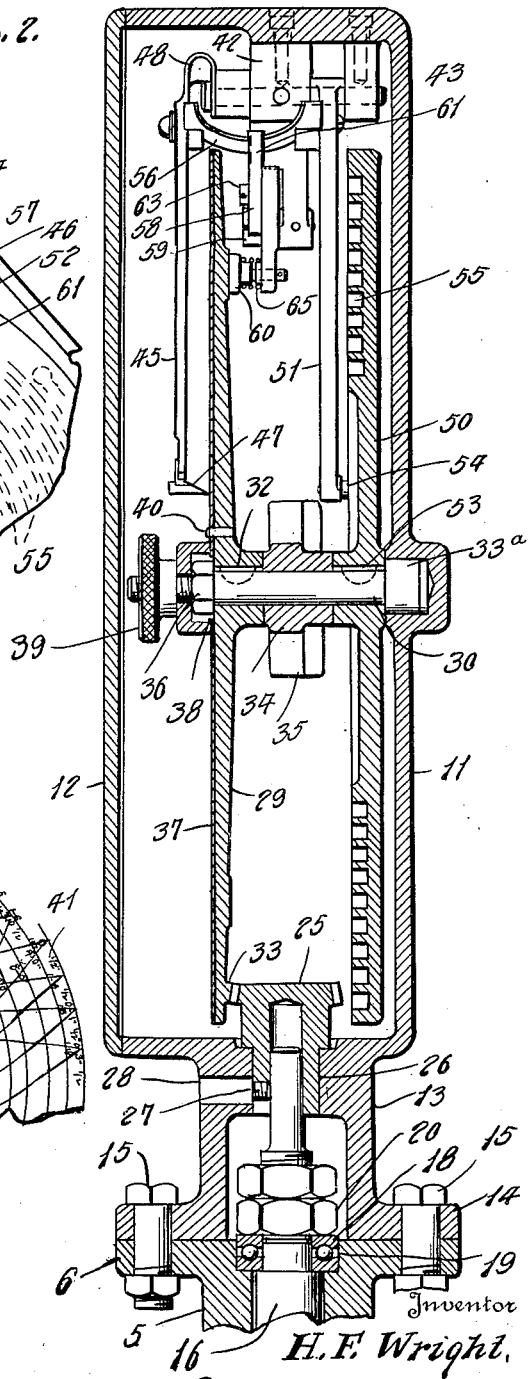
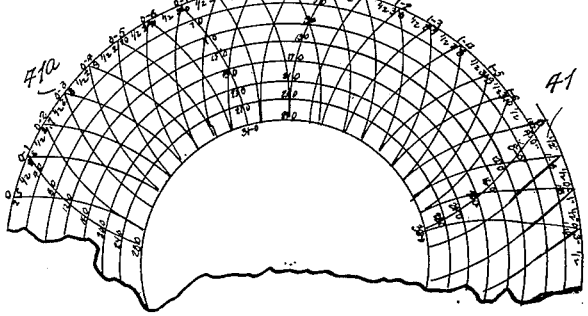
Inventor  
H. F. Wright, Patented July 31, 1928.

1,679,285

UNITED STATES PATENT OFFICE.

HENRY F. WRIGHT, OF HUNTINGTON, CALIFORNIA.

GAUGE AND RECORDER.

Application filed April 14, 1927. Serial No. 183,737.

This invention relates to and has for one of its objects to provide a novel, simple and highly efficient apparatus for indicating the amount of liquid in a tank and for recording the amount placed in and removed from the tank during any desired period of time.

With the foregoing and other objects in view, the nature of which will become apparent as the description proceeds, the invention consists of the construction, combination and arrangement of parts hereinafter fully described and claimed, and illustrated in the accompanying drawings, wherein:

Figure 1 is a view illustrating the application of the apparatus to a tank, the former being in elevation and the latter in vertical section, Figure 2 is a sectional view taken on a plane extending vertically and centrally through the apparatus, Figure 3 is a view of the upper portion of the apparatus illustrating a part of the pen actuating and controlling means, and Figure 4 is an elevational view of a fragmentary portion of the chart of the apparatus.

Referring in detail to the drawings, in the several views of which like reference characters denote like parts, 1 designates the top, 2 the bottom and 3 the side of a tank. The top 1 is provided with a dome 4 upon which the apparatus is mounted.

The apparatus comprises a base 5 which is of hollow cylindrical formation and provided with upper and lower flanges 6 and 7, respectively. The base 5 is positioned upon the dome 4, and is secured in place by bolts 8 which engage its flange 7 and the dome. A plate 9 rests upon the bottom 2, and rods 10 extend from the flange 7 to the plate 9 and are secured to said parts. A casing or housing 11 which is equipped with a hinged cover 12, is provided at its lower side with a hollow boss 13 which supports it upon and through the medium of which it is secured to the base 5. The boss 13 is provided at its lower end with a flange 14 which rests upon the flange 6 and through which flanges retaining bolts 15 pass. A spiral shaft 16 which occupies a position within the tank between the rods 10, is journaled at its lower end in a bearing 17 carried by the plate 9. The upper end portion of the shaft 16 is cylindrical and extends through the base 5 into the boss 13. A bearing 18 for the upper end portion of the shaft 16, is located in a recess 19 in the upper end of the base 5, and the shaft is supported from said bearing by a nut 20. A float 21 is located within the tank, and is slidably associated with the rods 10 which function as guides therefor. The float 21 is provided with an opening 22 for the reception of the shaft 16, and is connected to the shaft, so that it will rotate the same during its up and down movements within the tank, by means of an apertured block 23 which is secured thereto and provided with balls 24 contacting with opposite sides of the shaft.

A bevel pinion 25 which is located within the casing 11 and journaled in a bearing 26 formed in the upper end of the boss 13, is secured to the upper end of the shaft 16 by a set screw 27. The boss 13 is provided in a side thereof with an opening 28 to permit the application of the set screw 27, and in practice said opening is sealed to prevent tampering with the set screw. A dial 29 is rotatably supported within the casing 11 by a spindle 30, and is provided at its front side with a scale 31 graduated in inches and fractions thereof and representing the depth of the tank. The dial 29 is keyed as shown at 32 to the spindle 30, and is provided at its rear side with an annular series of teeth 33 which mesh with the pinion 25 and establish a driving connection between the dial and shaft 16. The spindle 30 is journaled at its rear end in a bearing 33$^a$ carried by the rear wall of the casing 11, and is journaled intermediate its ends in a bearing 34 which is supported from the side wall of the casing by arms 35. The spindle 30 is, due to the manner in which it is journaled, held against any lateral play or distortion. The dial 29 is held against axial play on the spindle 30 by the bearing 34 and a nut 36.

A chart 37 of circular contour is provided with a central opening 38 for the reception of the spindle 30 and nut 36, and is removably secured against the front face of the dial 29 by a nut 39 and pin 40. The nut 39 is mounted on the spindle 30 and is provided with an enlarged hollow inner end which receives the nut 36 and contacts with the chart 37. The pin 40 is carried by the dial 29 and passes through an opening in the chart 37 and insures the correct positioning of the chart on the dial. The chart 37 is provided with a scale representing in inches and fractions thereof the tank strapping. This scale consists of two sets of graduations 41 and 41ª which are spirally arranged and printed in contrasting colors. The graduations 41 indicate the amount placed in the tank, and the graduations 41ª indicate the amounts withdrawn from the tank.

A bearing bracket 42 is secured to the top of the casing 11 in rear of the dial 29 and is of substantially T-form. Shafts 43 and 44 are journaled in the bracket 42 above the dial 29 and at opposite sides of the vertical center thereof. Arms 45 and 46 which are positioned in front of the dial 29 and chart 37, are secured at their upper ends to the shafts 43 and 44, respectively, and are provided at their lower ends with pens 47 or other suitable markers. The marker arm 45 is connected to the shaft 43 by an arcuate spring 48, and the marker arm 46 is connected to the shaft 44 by a similar spring 49. The manner in which the marker arms 45 and 46 are connected by the springs 48 and 49 to the shafts 43 and 44 permits one of the marker arms to be supported in an inactive position while the other is in an active position, the pen 47 of the marker arm in inactive position being out of contact with the chart 37 and the pen of the marker arm in active position being in contact with the chart. The marker arms 45 and 46 are operated from the spindle 30 through the medium of a scroll disk 50 and levers 51 and 52. The scroll disk 50 is positioned upon the spindle 30 between the bearings 33 and 34, and is keyed to the spindle as shown at 53, the bearings holding the scroll disk against axial play on the spindle. The lever 51 is pivoted at its upper end to the shaft 43, and the lever 52 is pivoted at its upper end to the shaft 44. The levers 51 and 52 occupy positions between the dial 29 and the scroll disk 50, and are provided at their lower ends with studs or rollers 54 which are positioned in the groove 55 of the scroll disk. The marker arms 45 and 46 will when in operation swing across the chart 37, and the one in active position will form an arcuate line on the chart.

The means for controlling the marker arms 45 and 46 so that one will occupy an active and the other an inactive position during each upward and downward movement of the float 21, is operated from the dial 29 and comprises an arcuate spring 56 positioned between and secured at its ends to the marker arm 45 and its lever 51, a similar spring 57 positioned between and secured at its ends to the marker arm 46 and its lever 52, an arcuate lever 58 pivoted intermediate its ends as at 59 to the bracket 42 and bearing at its ends against intermediate portions of the springs 56 and 57, and a friction button or bolt 60 carried by the lever 58 below its pivot 59 and contacting with the rear face of the dial 29. The lever 59 is pivoted below and centrally between the shafts 43 and 44, and is provided with terminal parts 61 which are pivoted thereto as at 62 and secured against casual movement by screws 63. The end portions 61 are adjustable angularly with respect to the lever 58, and the movement of the lever in opposite directions is limited by screws 64 carried by the bracket 42 above the lever and at opposite sides of its pivot 59. The friction bolt 60 is carried by the lever 58 for movement axially with respect to the dial 29, and is held in contact with the dial by a spring 65. The springs 56 and 57 normally tend to hold the marker arms 45 and 46 in active position, and are adapted when lengthened, as the result of pressure applied thereto by the lever 58, to move the marker arms into inactive position. When the dial 29 is turning in a clockwise direction, due to the upward movement of the float 21, the lever 58 will be rocked in a direction to move the marker arm 46 into inactive position, the marker arm 45 being in active position marks the chart 37 in a manner to record the amount of liquid flowing into the tank. When the dial 29 is moving in a counter-clockwise direction, due to the downward movement of the float 21 the lever 58 will be rocked in a direction to move the marker arm 45 into inactive position, the marker arm 46 being in active position will record on the chart 37 the amount of liquid being withdrawn from the tank. The apparatus is to be provided with a fresh chart every day, and the old charts are to be filed away for the purpose of keeping a record of the amount of liquid daily placed in and removed from the tank. The marker arms 45 and 46 together with the scale 31 on the dial 29 enable the amount of liquid in the tank to be readily ascertained, and in view thereof the parts 45 and 46 constitute pointers as well as markers.

It should be understood that the drawings are merely illustrative and do not pretend to give exact proportions. Furthermore, the said drawings are illustrative of a preferred construction, it being my expectation that various changes and modifications may be made without departing from the spirit and scope of my invention.

What is claimed is:—

1. A device of the character set forth, comprising a support, a dial rotatably mounted on the support, a float, means establishing an operative connection between the dial and float, a chart carried by the dial, markers mounted for swinging movement with respect to the chart and for movement into and out of operative position with respect to the chart, means adapted during the movement of the dial in one direction to hold one of the markers in inoperative position and adapted during the movement of the dial in the opposite direction to hold the other marker in inoperative position and means for swinging the marker in operative position.

2. A device of the character set forth, comprising a support, a spindle journaled on the support, a dial fixed to the spindle, a scroll disk fixed to the spindle, a chart carried by the dial, a float, means establishing an operative connection between the dial and float, shafts journaled on the support, markers, means flexibly connecting the markers to the shafts, levers secured to the shafts and having elements positioned in the groove of the scroll disk, spring members positioned between the markers and levers, another lever pivoted on the support and having its ends positioned in close relation to the spring members, and a friction member carried by the last named lever and contacting with the dial.

3. A device of the character set forth, comprising a support, a spindle journaled on the support, a dial fixed to the spindle, a scroll wheel fixed to the spindle, a float, means establishing an operative connection between the dial and float, a chart carried by the dial, shafts journaled on the support, markers, means flexibly connecting the markers to the shafts, levers connected to the shafts and having elements positioned in the groove of the scroll disk, and means under the control of the dial and adapted during the movement of the dial in one direction to hold one of the markers in inoperative position and adapted during the movement of the dial in the opposite direction to hold the other marker in inoperative position.

4. A device of the character set forth, comprising a support, a dial rotatably mounted on the support, a float, means establishing an operative connection between the dial and float, a chart carried by the dial, shafts journaled on the support, markers, means flexibly connecting the markers to the shafts, marker rocking means connected to the shafts, and means under the control of the dial and adapted during the movement of the dial in one direction to hold one of the markers in inoperative position and adapted during the movement of the dial in the opposite direction to hold the other marker in inoperative position.

5. A device of the character set forth, including a rotatably mounted chart support, means for moving the support in opposite directions, markers, means for supporting the markers for movement into and out of operative position with respect to the chart and for supporting them for swinging movement parallel to the chart, said means being adapted to also constantly urge the markers in the direction of the chart, means adapted to permit one of the markers to be held in operative position and to hold the other in inoperative position during the movement of the support in each of said directions, and means for swinging the marker in operative position with respect to the chart.

6. A device of the character set forth, including a rotatably mounted chart support, means for moving the support in opposite directions, markers, means for supporting the markers for movement into and out of operative position with respect to the chart and for supporting them for swinging movement parallel to the chart, said means being adapted to also constantly urge the markers in the direction of the chart, means operable by the chart support to permit one of the markers to be held in operative position by said first means and to hold the other in inoperative position during the movement of the support in each of said directions, and means for swinging the markers.

7. A device of the character set forth, including a chart, means for moving the chart in opposite directions, markers, means for supporting the markers for swinging movement parallel to the chart, elastic members connecting the markers to said means for movement independently toward and from the chart, means adapted to permit one of the members to be held in operative position by its member and to hold the other marker in inoperative position against the tension of its member during the movement of the chart in each direction, and means for swinging the markers.

In testimony whereof I affix my signature.

HENRY F. WRIGHT.